Patented Mar. 2, 1937

2,072,771

UNITED STATES PATENT OFFICE 2,072,771

CHEMICAL PRODUCTS AND PROCESS OF PREPARING THE SAME

George W. Rigby, Wilmington, Del., assignor to E. I. du Pont de Nemours & Company, Wilmington, Del., a corporation of Delaware No Drawing. Application May 11, 1936, Serial No. 79,178

14 Claims. (Cl. 260—152)

This invention relates to substitution products of deacetylated chitin and more particularly to alkyl and substituted alkyl deacetylated chitins, and to methods for making them.

This case is a continuation in part of my copending application Serial Number 731,600, filed June 21, 1934.

Chitin is the chief component of the horny exo-skeletons of crustacea such as shrimp, crabs and lobsters. According to the currently accepted theories, it is a polymer of an acetylated glucosamine. Various attempts have been made to deacetylate the material to an extent such that it would be soluble in dilute acids while retaining the chitin nucleus sufficiently unchanged that the product could be regarded as substantially undegraded, i. e. such that a coherent film could be obtained therefrom.

Such attempts were not successful prior to the invention outlined in the above-identified application which discloses a process whereby a substantially undegraded chitin, deacetylated to the point of solubility in 5% aqueous acetic acid, may be obtained. This is a true deacetylated chitin, since the chitin structure is retained therein and yet at least some of the acetyl groups have been removed. The term "deacetylated chitin", as it is used herein to characterize the starting material, indicates this particular product. Where "chitin" is used as the parent name for the products of the present application (e. g. benzyl deacetylated chitin), I also desire to convey the meaning that the chitin nucleus remains sufficiently unchanged so that the product can be regarded as substantially undegraded.

This invention has as an object the preparation of alkyl deacetylated chitins in which the alkyl groups in turn may or may not contain substituent groups such as hydroxyl, carboxyl, and aryl. Other objects will appear hereinafter.

These objects are accomplished by the following invention wherein deacetylated chitin as above defined is reacted in neutral, acid or alkaline medium with an etherifying agent, for example, an alkylating agent, having, for example, the formula $(R)_nX$, where X is a functional group capable of uniting with primary amino hydrogen, $n$ is the valence of X, and R is an alkyl, alkenyl or substituted alkyl or alkenyl radical. The products may be considered as derivatives of deacetylated chitin in which reactive hydrogen is replaced by an alkyl, alkenyl or substituted alkyl or alkenyl radical.

In carrying out my invention, I may follow any one of four general processes. In the first (Example I), a solution of the deacetylated chitin in acid is emulsified with the alkylating agent and alkali then added, in successive small portions if desired. In the second, (Example II), the deacetylated chitin is first converted to a more reactive form by dissolving in acid and precipitating with ammonia or alkalies, the reprecipitated deacetylated chitin then being separated and treated with alkali, after which it is reacted with the alkylating agent. In the third method (Example III), the deacetylated chitin is reacted directly with alkali and alkylating agent without a preliminary solution in acid or a preliminary precipitation. The fourth method (Example IV) consists in carrying out the reaction in the presence of a diluent, other details being the same as for any one of the preceding three methods.

The exact nature of the products, with particular reference to degree of substitution and solubility, will depend upon, among other things, which of the above methods is followed. With comparable proportions, temperatures, and the like, the degree of substitution will generally be highest by the first method, less by the second, still less by the third, and least by the fourth. Under similarly comparable conditions, the solubility in aqueous acids will increase, and the solubility in organic solvents decrease, in the order of methods 1, 2, 3, and 4. The first method is in general preferable since it permits the preparation of products having a wider range of substitution and solubility.

Having thus outlined the principles and objects of the invention, the following exemplifications of the invention are added in illustration and not in limitation.

Example I

Three hundred parts of deacetylated chitin (having a viscosity of 13 poises in 5% solution in 1.5% acetic acid at 25° C.) dissolved in 5,700 parts of 1.5% acetic acid were emulsified with 1915 parts of benzyl chloride by adequate stirring. To this emulsion was added 1340 parts of 50% sodium hydroxide. The temperature was raised to 90° C. and stirring continued for 16 hours. The product gradually separated as a soft gum which clung to the stirrer and to the reaction vessel. At the end of the reaction the aqueous layer was separated and the gum hardened with methanol. The solid thus obtained was repeatedly macerated with methanol and finally water until the washings were halogen free. After drying at 60° C. the white porous solid amounted to 577.3 parts.

The benzyl deacetylated chitin prepared above was soluble in glacial acetic acid, benzyl alcohol, chloroform, dioxane, pyridine, 90% chloroform: 10% alcohol, 90% toluene : 10% alcohol, and 80% benzene : 20% alcohol. It was swollen by acetone, ethyl acetate, and 90% amyl acetate: 10% alcohol. It was insoluble in 1.5% acetic acid, water, alcohol, methanol, ether and linseed oil.

A solution of the product prepared by dissolving 15 parts of the solid in 45 parts of a mixture of 80% benzene : 20% alcohol gave a clear, transparent, tough and water resistant film when cast on a glass plate and allowed to dry.

A solution of one part of this derivative in 22.6 parts of a mixture of 90% toluene and 10% alcohol was mixed with a solution of 9 parts of cellulose acetate in 34 parts of acetone. The resultant solution was somewhat cloudy. When cast on a glass plate and allowed to dry it gave a white and opaque film which was strong, flexible and tough.

A solution of 1.2 parts of the benzyl derivative of deacetylated chitin in 22 parts of ethanol, 48 parts of toluene and 17.5 parts of ethyl acetate was added to 10.8 parts of nitrocellulose and the mixture stirred until homogeneous. The resulting solution was somewhat cloudy and gave an opaque white film when cast on a glass plate and dried.

Example I illustrates the preferred method of preparing an organic solvent soluble derivative of deacetylated chitin. The product contains about 2 benzyl groups per $C_6$ unit as shown by the increase in weight and by the amount of acid taken up from 0.1 N hydrochloric acid. Probably only about half of the benzyl groups are on the nitrogen atom since a glacial acetic acid solution of the product reacts rapidly at 50° C. with acetic anhydride to form an insoluble product (see Example XI).

*Example II*

To 300 parts of deacetylated chitin was added 5,700 parts of 1.5% acetic acid and the mixture stirred to a clear solution. This solution was then poured into 8,000 parts of water containing 500 parts of 28% aqueous ammonia. The solid was separated, broken up into small pieces by rapid stirring, filtered and washed once with water. The moist solid was transferred to a suitable vessel and mixed with 785 parts by volume of 50% sodium hydroxide. The mixture was heated with stirring until all the ammonia had been driven out and then 1,910 parts of benzyl chloride was added. Stirring and heating at 100-105° C. were continued for 5 hours, then the temperature was lowered to 90° C. for 19 hours. The viscous gum was separated from the aqueous solution, hardened in methanol, ground to a fine powder in a power grinder, and steamed until benzyl alcohol and excess benzyl chloride had been removed. The product was dissolved in a mixture of 80 parts of benzene and 20 parts alcohol, diluted to a suitable concentration with this solvent, filtered, and a small quantity of wetting agent or soap added. This solution was then steamed until the solvent had been completely removed. The product was a white porous powder, easily washed with water and easily redissolved in organic solvents.

*Example III*

To 750 parts of deacetylated chitin suspended in 3,000 parts of water was added 4,710 parts of benzyl chloride and 2,980 parts of 50% sodium hydroxide. The mixture was heated for 24 hours at 85° C. with efficient stirring. The gum was separated from the aqueous layer and 300 parts of benzene was added. The benzene solution was then steamed to remove the solvent. The solid thus obtained was washed with water until the washings were halogen free and dried at 50° C. The yield was 1,548 parts by weight.

The product was easily soluble in glacial acetic acid, benzyl alcohol, chloroform, dioxane, pyridine, 90% amyl acetate and 10% alcohol, 90% chloroform and 10% alcohol, 90% toluene and 10% alcohol and 80% benzene and 20% alcohol. It was swollen by acetone and ethyl acetate. It was insoluble in 1.5% acetic acid and in linseed oil.

*Example IV*

To 75 parts of deacetylated chitin (having a viscosity of 14 poises in 5% solution in 1.5% acetic acid at 25°) contained in a suitable vessel were added 28 parts of glacial acetic acid, 600 parts of water, 100 parts of benzene and 82 parts benzyl chloride. The mixture was stirred until a homogeneous emulsion was obtained, then 82.5 parts of 50% sodium hydroxide solution was added. The temperature was raised to 80° C. and stirring continued for 16 hours. The product, after washing, was broken up as in Example I and dried to 99.7 parts.

The benzyl deacetylated chitin prepared in Example IV was soluble in glacial acetic acid and 1.5% acetic acid. It was highly swollen by benzyl alcohol, chloroform, dioxane, pyridine, ethyl acetate, 90% amyl acetate—10% alcohol mixture, 90% chloroform—10% alcohol mixture, and 90% toluene—10% alcohol mixture. It was insoluble in water, alcohol, methanol, acetone, ether and linseed oil.

*Example V*

To 50 parts of deacetylated chitin contained in a suitable vessel was added 950 parts of 1.5% acetic acid and the mixture stirred to a clear solution. Then 230 parts of n-butyl chloride was added and the emulsion thoroughly stirred. The temperature was raised to 85° C. and maintained at this temperature for 25 hours during which time 225 parts of 50% sodium hydroxide was added. At the completion of this time the product was poured into methanol, filtered, extracted with methanol and finally washed with water until the washings were free from halogen. The butyl deacetylated chitin thus obtained was soluble in 1.5% acetic acid, swollen by glacial acetic acid and insoluble in organic solvents. Acid absorption showed that it contained about 1 butyl group per glucose amine residue.

*Example VI*

Ten parts of deacetylated chitin was dissolved in 190 parts of 1.5% acetic acid and emulsified with 20 parts of n-dodecyl chloride. The emulsion was heated for 24 hours at 90° C. with stirring. It gradually increased in viscosity until the entire mass was a sticky gum. Fifty parts of 10% sodium hydroxide was added and the heating continued for 8 hours. The entire mixture was then macerated with methanol, extracted with methanol, and finally washed with water until free of halogen, then dried. The dodecyl deacetylated chitin thus obtained (8 parts) was insoluble in benzyl alcohol, chloroform, dioxane, pyridine, and all organic solvents with which it was tested. It was difficultly soluble in 1.5% acetic acid. The n-dodecyl chloride used in this example may be replaced with good results by the mixture of alkyl chlorides obtained from the alcohols produced by carboxyl hydrogenation of coconut and other saturated fatty oils.

In a similar preparation, 5 parts of deacetylated chitin yielded 9.5 parts of n-dodecyl deacetylated chitin after heating at 100° C. for 14 days with same proportions of alkali and dodecyl chloride as above. The product was soluble in glacial acetic acid from which solution a film was formed by casting on a glass plate and allowing the cast film to dry at room temperature.

*Example VII*

To 225 parts of deacetylated chitin contained in a suitable vessel was added 5,200 parts of water and 528 parts of chloroacetic acid. The mixture was stirred until a clear homogeneous solution was obtained, then 910 parts of 50% sodium hydroxide solution was added during 6 hours. The temperature was held at 60–70° C. for a total of 12 hours during which time stirring was continued. The product was a viscous, clear solution having a slightly alkaline reaction. The solution was poured with stirring into a large volume of methanol, filtered and the solid extracted with methanol until the washings were halogen free. The product after drying to a constant weight amounted to 279 parts. It was soluble in water, slightly alkaline solutions and slightly acid solutions, but was insoluble in strongly acid or strongly alkaline solutions. It was insoluble in organic solvents. Films of good clarity, flexibility and strength were prepared by allowing a neutral aqueous solution to dry on a glass plate.

*Example VIII*

To 10 parts of deacetylated chitin suspended in 180 parts of water was added 25 parts of ethylene oxide. The mixture was agitated by suitable means for 12 hours at 30° C. At the end of this time the product was filtered off, washed with water and dried. The product thus obtained was soluble in 1.5% acetic acid to form a clear solution from which films of good quality were cast. Glycol chlorohydrin may be used instead of ethylene oxide.

*Example IX*

To 10 parts of deacetylated chitin dissolved in 190 parts of 1.5% acetic acid was added, with stirring, 20 parts of β,β'-dichlorodiethyl ether. The emulsion thus obtained was heated to 85° C. on a water bath with continued stirring while 124 parts of 10% sodium hydroxide was added during 12 hours. The material gradually became more viscous until the entire mass set to a jelly. After washing the product with methanol and finally with water until the washings were free of halogen, it was dried at room temperature. The yield was 8 parts of a product insoluble in 1.5% acetic acid, glacial acetic acid and the usual organic solvents. This product is useful as a pigment.

*Example X*

Seventeen hundred and twenty parts of diethyl sulfate was added to 300 parts of deacetylated chitin dissolved in 5,700 parts of 1.5% aqueous acetic acid. The mixture was stirred at room temperature until a homogeneous emulsion was obtained. Seventeen hundred and ninety parts of 50% sodium hydroxide were then added slowly accompanied by stirring and external cooling to keep the temperature below 45–55° C. After the initial reaction subsided, the temperature was gradually raised to 100° C. at which point it was maintained for 8 hours, stirring being continued. The ethyl deacetylated chitin thus obtained was separated, washed with water until the washings were free of sulfate, and then dried at 50° C. to constant weight. This product was soluble in glacial acetic acid and in 1.5% aqueous acetic acid. Transparent, tough, and flexible films may be cast from a 5% solution in acid of the latter concentration. Methyl deacetylated chitin may be prepared in a similar manner from dimethyl sulfate.

The alkyl deacetylated chitins of the present invention may be esterified as disclosed in the following example.

*Example XI*

To one part of benzyl deacetylated chitin (prepared as in Example II) dissolved in 5 parts of glacial acetic acid was added with stirring, 5 parts of acetic anhydride. The solution soon warmed up and spontaneously set to a firm jelly. This product was heated to 50° C. for 6 hours. The friable jelly thus obtained was mechanically broken up and then extracted with methanol and finally with water until all excess acid had been removed. After drying at room temperature, the white powder was found to be insoluble in pyridine, dioxane, methanol, benzene, water, 1.5% acetic acid and the usual organic solvents. It is useful as a pigment and a delusterant.

Examples I–X above disclose the introduction into deacetylated chitin of lower alkyl groups such as methyl, ethyl and butyl, higher alkyl groups such as n-dodecyl, and substituted alkyl groups such as hydroxyethyl, benzyl, and carboxymethyl. Not only may the alkylating agent contain one reactive group as in Examples I to VIII and X, but it may also contain more than one as in Example IX.

Etherifying agents in general may be employed. These include not only alkylating agents in the narrow sense of agents introducing a saturated aliphatic hydrocarbon radical, but also etherifying agents which introduce a substituted alkyl radical, an olefinic radical, etc. Thus the term "etherifying" agent includes benzyl bromide, ethyl iodide, methyl chloride, benzyl iodide, butyl bromide, ethylene chlorohydrin, glycerol chlorohydrin, chlorostearic acid, sodium dodecylsulfate, 1,3-dichlorobutene-2, 1-chloro-2-butene, ethoxyethyl chloride, methoxyethyl chloride, xylyl bromide, cyclohexyl chloride, propyl bromide, chloromalonic ester. The derivatives of the present invention thus include and the invention is generic to not only alkyl derivatives in the narrow sense of alkyl, i. e., saturated aliphatic hydrocarbon radical, but also alkenyl, substituted alkenyl, and substituted alkyl, including hydroxyalkyl, carboxyalkyl and aralkyl. It is to be noted that these derivatives may be regarded as deacetylated chitins wherein an active hydrogen is replaced by the radical of an alcohol.

A preferred class of the derivative of the present invention is that of the alkyl and substituted alkyl derivatives which may be obtained by the action of an etherifying agent of the formula $$R_n X$$

wherein X is a functional group capable of reacting with primary amino hydrogen, for example Cl—, Br—, I—, $SO_4$=, $CH_3C_6H_4SO_3$—, and the like, $n$ is equal to the valence of X and R is a monovalent radical such as an alkyl, aralkyl, carboxyalkyl or hydroxyalkyl radical, i. e., an alkyl or substituted alkyl radical.

Sodium hydroxide has been disclosed as a suitable base for alkylating and etherifying but any water soluble strong base may be employed including sodium, potassium, barium and calcium hydroxides.

Only substantially undegraded deacetylated chitin, e. g. that prepared by the process disclosed in my copending application Serial No. 731,600 is useful in the present invention. Chitin itself does not seem to be applicable to any step in this process. Substantially degraded deacetylated chitin does not give useful products. By "degraded" is meant that a 5% solution in 5% acetic acid has a viscosity of less than one poise or that the deacetylated chitin is incapable of being formed into a coherent film.

The temperature at which the alkyl deacetylated chitins and other deacetylated chitin ethers are prepared varies with the reagent used. Thus deacetylated chitin and chloroacetic acid do not give useful products at temperatures much above 70° C., since dark colored decomposition products result. On the other hand less reactive reagents such as n-dodecyl chloride may require temperatures of 100° C. or above to give a useful degree of substitution.

The etherification and particularly the alkylation of the deacetylated chitin may if desired be conducted in the presence of liquid diluents such as water, ethers, and hydrocarbons which should ordinarily be solvents for the reactance and reaction products, but in some instances are not. Suitable organic diluents are benzene, toluene, and dioxane.

Included within the scope of this invention is the treatment with alkylating or etherifying agents of formed articles of deacetylated chitin, such as films and filaments prepared as in my application Serial No. 731,601, under conditions which do not involve solution, whereby the film or filament is rendered more water-resistant and in many cases insoluble.

While I do not wish to be confined to any particular explanation of the present invention, I believe that in all instances reaction takes place at least in part at the amino groups of the deacetylated chitin. Whether or not the alcohol groups therein are involved probably depends upon hydrogen ion concentration, on the particular alkylating agent used, and on the duration and temperature of reaction. In neutral or acid media probably only the amino hydrogens react since the products generally retain their acid-solubility but do not become organic-solvent soluble (see Example IV). An alkaline medium probably permits the reaction to be in part diverted to the alcohol groups since the products gradually become organic-solvent-soluble (see Examples I, II and III). Higher temperatures and longer reaction periods may favor reaction with alcohol groups. A few etherifying agents such as chloroacetic acid probably react wholly with amino hydrogen, regardless of conditions. In all cases, I obtain what I believe to be derivatives of deacetylated chitin wherein active hydrogen atoms (i. e. amino hydrogens or hydroxyl hydrogens) are replaced by alkyl radicals, which in turn may or may not contain substituent groups. The products may be considered as typical ethers, or as ammonia system nitrogen ethers, of deacetylated chitin.

The products prepared by this invention may be formed into films and filaments, alone or in combination with viscose, cellulose acetate, cellulose nitrate, etc. They may also be molded or used in the formulation of coating, impregnating or adhesive compositions. Many of the products described herein may be utilized in different fields from those in which the original deacetylated chitin is useful. For example, nearly all are thermoplastic, whereas the original material is not, and they can be readily shaped, as in a mold. The carboxy alkyl ethers in particular are readily compatible with viscose, whereas deacetylated chitin itself, being completely insoluble in alkali, is not.

The above description and examples are intended to be illustrative only. Any modification of or variation therefrom which conforms to the spirit of the invention is intended to be included within the scope of the claims.

I claim:
1. Process of preparing benzyl deacetylated chitin which comprises reacting benzyl chloride with deacetylated chitin in the presence of aqueous sodium hydroxide.
2. Process of preparing benzyl deacetylated chitin which comprises reacting a benzyl halide with deacetylated chitin in the presence of a water soluble strong base.
3. Process of preparing an alkyl deacetylated chitin which comprises reacting an alkylating agent with deacetylated chitin in the presence of a water soluble strong base.
4. Process which comprises reacting deacetylated chitin with an etherifying agent of the formula

$$R_n X$$

wherein $X$ is a functional group capable of reacting with primary amino hydrogen, $n$ is the valence of $X$, and $R$ is a monovalent radical selected from the group consisting of alkyl, aralkyl, carboxyalkyl, and hydroxyalkyl radicals.
5. Process which comprises reacting deacetylated chitin with an etherifying agent.
6. A benzyl deacetylated chitin.
7. An aralkyl deacetylated chitin.
8. A carboxyalkyl deacetylated chitin.
9. A hydroxyalkyl deacetylated chitin.
10. A substituted alkyl deacetylated chitin.
11. An ether of deacetylated chitin.
12. A derivative of deacetylated chitin wherein an active hydrogen is replaced by the radical of an alcohol.
13. A derivative of deacetylated chitin wherein an active hydrogen is replaced by a radical of the class consisting of alkyl and substituted alkyl radicals.
14. A derivative of deacetylated chitin wherein an active hydrogen is replaced by the radical of an etherifying agent.

GEORGE W. RIGBY.